United States Patent
Lin et al.

(10) Patent No.: US 11,223,749 B1
(45) Date of Patent: Jan. 11, 2022

(54) SCALER, DISPLAY DEVICE AND ASSOCIATED DATA PROCESSING METHOD

(71) Applicant: Realtek Semiconductor Corp., HsinChu (TW)

(72) Inventors: Ying-Hsin Lin, HsinChu (TW); Wen-Hsia Kung, HsinChu (TW); Chun-Chieh Chan, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/332,973

(22) Filed: May 27, 2021

(30) Foreign Application Priority Data

Jul. 9, 2020 (TW) .................................. 109123133

(51) Int. Cl.
*H04N 5/06* (2006.01)
(52) U.S. Cl.
CPC ..................................... *H04N 5/06* (2013.01)
(58) Field of Classification Search
CPC .. H04N 5/10; H04N 5/00; H04N 5/04; H04N 5/06; H04N 5/08
USPC ................. 348/521, 529, 547, 500; 375/354
See application file for complete search history.

(56) References Cited

U.S. PATENT DOCUMENTS

| | | | |
|---|---|---|---|
| 2012/0134602 A1* | 5/2012 | Lee .......................... | H04N 7/01 382/276 |
| 2017/0116912 A1* | 4/2017 | Morimoto ............ | G09G 3/2092 |

* cited by examiner

Primary Examiner — Sherrie Hsia
(74) Attorney, Agent, or Firm — Winston Hsu

(57) ABSTRACT

A scaler includes an input interface, an output Vsync pulse generating circuit and a data buffer circuit. The input interface is arranged to receive an input Vsync pulse and input image data. The output Vsync pulse generating circuit is arranged to accordingly generate a first output Vsync pulse and a first output request in response to the input Vsync pulse. The data buffer circuit is arranged to buffer the input image data and, in response to the first output request, output a first output frame according to the input image data. The output Vsync pulse generating circuit further generates a second output Vsync pulse and a second output request according to the first output Vsync pulse and a first predetermined period and in response to the second output request, the data buffer circuit further outputs a second output frame according to the input image data.

15 Claims, 4 Drawing Sheets

SCALER, DISPLAY DEVICE AND ASSOCIATED DATA PROCESSING METHOD

BACKGROUND OF THE INVENTION

1. Field of the Invention

The invention relates to a data processing method, more particular to a data processing method for dynamically performing frame rate conversion to generate an output image signal with a frame rate that is supported by a display panel based on an input image signal obtained at a frame rate that is not supported by the display panel.

2. Description of the Prior Art

Generally, in order to ensure low latency and synchronization of the output image signal, the input and output interfaces of a scaler can operate in a frame sync mode. In the frame sync mode, the Vertical Synchronization signal Vsync issued by the output interface and provided to the back-end display panel is synchronously generated based on the Vertical Synchronization signal Vsync received from the image source via the input interface.

However, when the input image signal is obtained at a frame rate that cannot be supported by the display panel, if the scaler operates in the frame sync mode, the frame rate of the output image signal is still unable to be supported by the display panel. In this way, the problem of display abnormality will occur.

To solve this problem, a novel data processing method for dynamically performing frame rate conversion when required is needed. Via the data processing method, an output image signal with a frame rate that is supported by a display panel is generated based on an input image signal obtained at a frame rate that cannot be supported by the display panel. In addition, the latency of the output image signal also satisfies the low latency requirement defined by the corresponding specification.

SUMMARY OF THE INVENTION

It is an objective of the invention to generate an output image signal at a frame rate that can be supported by the display panel based on the input image signal that is obtained at a frame rate that cannot be supported by the display panel, and the delay of the output image signal can also satisfy the low latency requirement defined by the corresponding specification.

According to an embodiment of the invention, a scaler comprises an input interface, an output vertical synchronization pulse generating circuit and a data buffer circuit. The input interface is arranged to receive an input vertical synchronization pulse and input image data. The output vertical synchronization pulse generating circuit is coupled to the input interface and arranged to accordingly generate a first output vertical synchronization pulse and a first output request in response to the input vertical synchronization pulse. The data buffer circuit is arranged to buffer the input image data and, in response to the first output request, output a first output frame according to the input image data. The output vertical synchronization pulse generating circuit is further arranged to generate a second output vertical synchronization pulse and a second output request according to the first output vertical synchronization pulse and a first predetermined period, and, in response to the second output request, the data buffer circuit is further arranged to output a second output frame according to the input image data.

According to another embodiment of the invention, a display device comprises a scaler and a display panel. The scaler is arranged to receive an input vertical synchronization pulse and input image data from an image source, generate a plurality of output vertical synchronization pulses according to the input vertical synchronization pulse and generate a plurality of output frames according to the input image data. The display panel is coupled to the scaler and arranged to display the output frames according to the output vertical synchronization pulses. The output vertical synchronization pulses comprise at least a first output vertical synchronization pulse and a second output vertical synchronization pulse, the output frames comprise at least a first output frame and a second output frame, the scaler is arranged to accordingly generate the first output vertical synchronization pulse in response to the input vertical synchronization pulse and accordingly output the first output frame in response to the first output vertical synchronization pulse. The scaler is further arranged to generate the second output vertical synchronization pulse according to the first output vertical synchronization pulse and a first predetermined period, and accordingly output the second output frame in response to the second output vertical synchronization pulse.

According to yet another embodiment of the invention, a data processing method comprises: receiving an input vertical synchronization pulse and input image data from an image source; generating a plurality of output vertical synchronization pulses according to the input vertical synchronization pulse; and generating a plurality of output frames according to the input image data. The output vertical synchronization pulses comprise at least a first output vertical synchronization pulse and a second output vertical synchronization pulse, the input image data comprises an input frame, the output frames comprise at least a first output frame and a second output frame, and step of generating the output vertical synchronization pulses according to the input vertical synchronization pulse further comprises: accordingly generating the first output vertical synchronization pulse in response to the input vertical synchronization pulse; and generating the second output vertical synchronization pulse according to the first output vertical synchronization pulse and a first predetermined period. Step of generating the output frames according to the input image data further comprises: accordingly outputting the input frame as the first output frame in response to the first output vertical synchronization pulse; and accordingly outputting the input frame as the second output frame in response to the second output vertical synchronization pulse.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
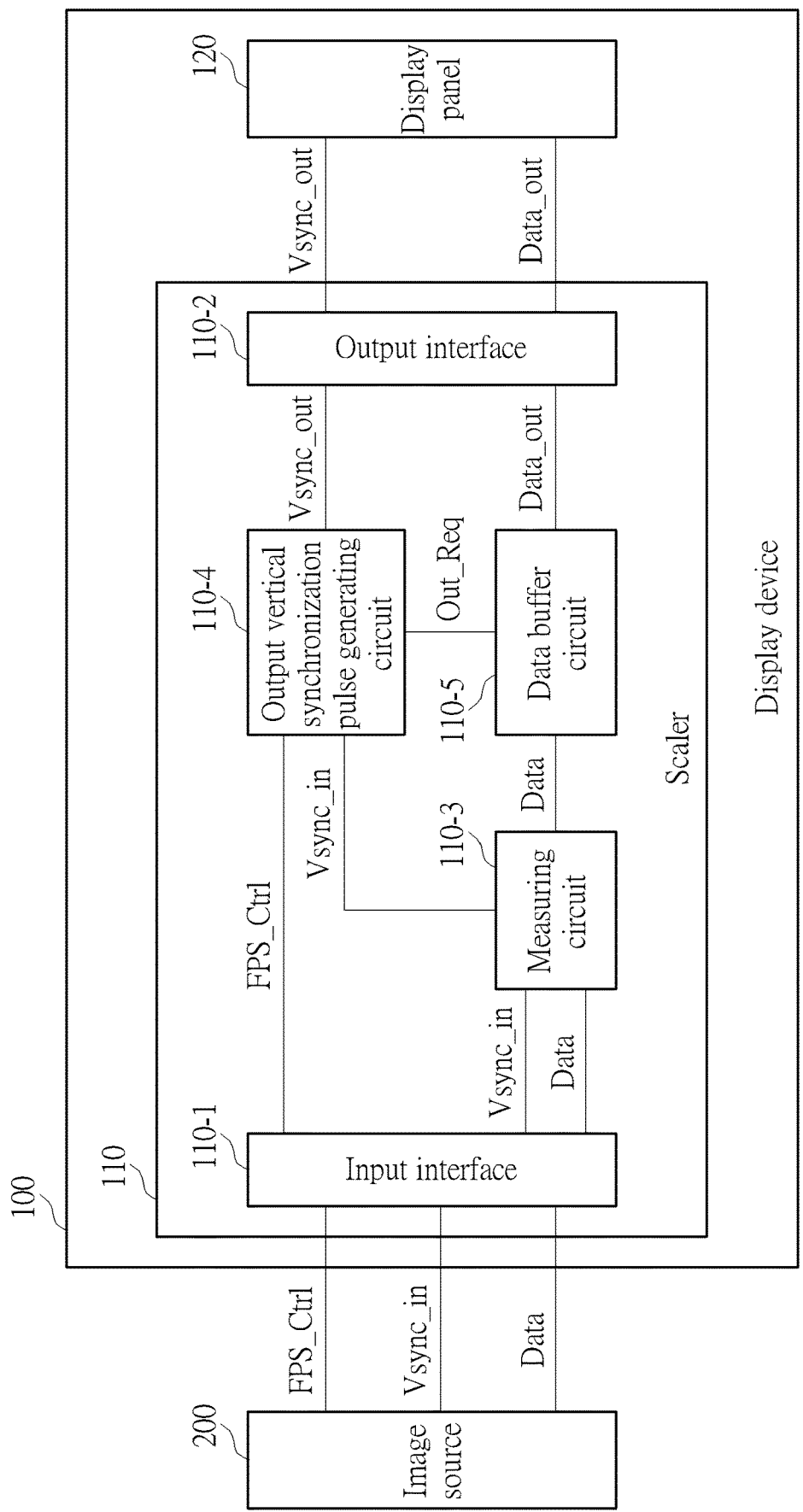
FIG. 1 shows a block diagram of a display device according to an embodiment of the invention.

FIG. 1 shows a block diagram of a display device according to an embodiment of the invention. The display device 100 may comprise a scaler 110 and a display panel 120. The display panel 120 is arranged to receive an input vertical synchronization signal Vsync_in and input image data Data from an image source 200. The image source 200 may be an electronic device, such as a computer, a mobile communication device, a set-up box, etc., capable of providing image data. The input vertical synchronization signal Vsync_in may comprise a plurality of input vertical synchronization pulses (hereinafter called Vsync pulses for brevity). The input image data Data may comprise a plurality of input frames.

Generally, the image source 200 sequentially outputs a Vsync pulse and the corresponding image data (for example, one frame) to the display device 100, so that the display panel 120 may display the corresponding frame in response to the Vsync pulse after a predetermined delay. In addition, the scaler 110 may perform some data processing operations, such as scaling the screen size of the frame, frame rate conversion . . . etc., on the received frame data, and then provide the processed data (including the Vsync pulse and the image data) to the display panel 120.

According to an embodiment of the invention, the scaler 110 may comprise at least an input interface 110-1, an output interface 110-2, a measuring circuit 110-3, an output vertical synchronization pulse generating circuit 110-4 and a data buffer circuit 110-5. It should be noted that FIG. 1 is a simplified block diagram of a display device, in which only the components relevant to the invention are shown. As will be readily appreciated by a person of ordinary skill in the art, a display device may further comprise other components not shown in FIG. 1 and arranged for implementing the functions of displaying and related data processing.

The input interface 110-1 is arranged to receive the input vertical synchronization signal Vsync_in, the input image data Data and the frame rate control signal FPS_Ctrl from the image source 200. The frame rate control signal FPS_Ctrl is a switch signal for notifying the display device 100 whether the image data provided by the image source 200 will be low frame rate image data. For example, the signal level of the frame rate control signal FPS_Ctrl may be switched between a first state (for example, the logic '0') and a second state (for example, the logic '1'). The first state represents that the forthcoming image data is not low frame rate image data, and the second state represents that the forthcoming image data is low frame rate image data. The image source 200 may notify the display device 100 in advance for at least one frame ahead. For example, suppose that the current frame is the image data transmitted in compliance with the High Definition Multimedia Interface (HDMI) Variable Refresh Rate (VRR) standard, and the next frame is the image data transmitted in compliance with the HDMI 2.1 Cinema VRR standard, since the Frame Rate per Second (FPS) specified in the HDMI 2.1 Cinema VRR standard is extreme low frame rate as compared to the commonly used frame rate nowadays, for example, the FPS specified in the HDMI 2.1 Cinema VRR standard may include 24 fps, 25 fps, 30 fps . . . etc., the image source may control the signal level of the frame rate control signal FPS_Ctrl to be switched from the first state to the second state during the control signal transmission interval of the current frame, so as to notify the display device 100 that the next frame will be low frame rate image data transmitted in compliance with the HDMI 2.1 Cinema VRR standard.

The measuring circuit 110-3 may obtain the input vertical synchronization signal Vsync_in and the input image data Data from the input interface 110-1, and measure the corresponding frame rate of each frame according to the input vertical synchronization signal Vsync_in and the input image data Data. Generally, the frame rate corresponding to one frame is defined by the Vsync pulse corresponding to this frame and the Vsync pulse corresponding to a next frame after this frame. The measuring circuit 110-3 may obtain the frame rate corresponding to one frame according to a reciprocal of the time between two adjacent Vsync pulses.

The output vertical synchronization pulse generating circuit 110-4 is arranged to generate an output vertical synchronization signal Vsync_out and output requests Out_Req in response to the input vertical synchronization pulse signal Vsync_in and the frame rate control signal FPS_Ctrl. The output vertical synchronization signal Vsync_out may comprise a plurality of output Vsync pulses.

The data buffer circuit 110-5 is arranged to buffer the input image data Data and output the image data buffered therein as the output image data Data_Out according to the output request Out_Req. The output image data Data_Out may comprise a plurality of output frames.

The output interface 110-2 is coupled to the display panel 120 and arranged to provide the output vertical synchronization signal Vsync_out and the output image data Data_Out to the display panel 120. The display panel 120 may display the corresponding output frames according to the output Vsync pulses of the output vertical synchronization signal Vsync_out.

To avoid the aforementioned display abnormality, according to an embodiment of the invention, when processing the low frame rate image data (for example, the image data with the corresponding frame rate that is lower than the lowest frame rate supported by the display panel 120), the scaler 110 is arranged to generate a plurality of output Vsync pulses according to one input Vsync pulse and generate a plurality of output frames according to the input image data Data, thereby increasing the corresponding frame rate of the output frames to be in the range of the frame rates supported by the display panel 120, while ensuring low latency and synchronization of the output image signal at the same time. The range of the frame rates supported by the display panel 120 may be recorded in the Extended display identification data (EDID), and the EDID may be stored in an external memory (not shown in FIG. 1) of the scaler 110, or may be defined in its system program codes.

Figure 2:
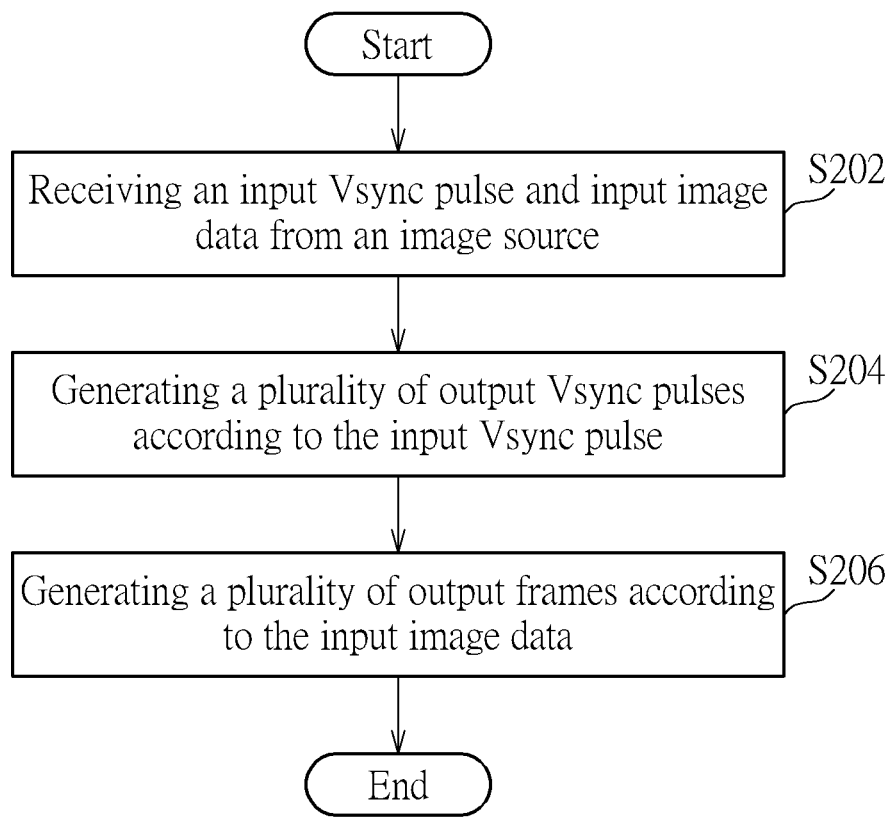
FIG. 2 shows a flow chart of a data processing method according to an embodiment of the invention.

FIG. 2 shows a flow chart of a data processing method according to an embodiment of the invention. The data processing method may be performed by the scaler 100 and comprise the following steps:

Step S202: Receiving an input Vsync pulse and input image data from an image source.

Step S204: Generating a plurality of output Vsync pulses according to the input Vsync pulse.

Step S206: Generating a plurality of output frames according to the input image data.

To be more specific, in response to the input Vsync pulse, the output vertical synchronization pulse generating circuit 110-4 may first accordingly generate a first output Vsync pulse in response to the input Vsync pulse. In the embodiments of the invention, as the operations in the frame sync mode, the first output Vsync pulse is synchronously generated according to the input Vsync pulse. For example, the output vertical synchronization pulse generating circuit 110-4 may directly provide the received input Vsync pulse to the display panel 120. Here, the aforementioned "synchronously generating the first output Vsync pulse according to the input Vsync pulse" means that only a reasonable circuit transmission delay is included between the time when the input Vsync pulse is received and the time when the first output Vsync pulse is generated. For example, the time delay required for passing the data or signal through several internal line buffer circuits inside of the scaler 110.

In addition, the output vertical synchronization pulse generating circuit 110-4 may also generate the first output request according to the first output Vsync pulse. In response to the first output request, the data buffer circuit 110-5 accordingly generates the first output frame according to the buffered input image data. For example, the data buffer circuit 110-5 outputs the received input frame as the first output frame in response to the first output request, so that the scaler 110 may accordingly output the input frame as the first output frame via the output interface 110-2 in response to the first output Vsync pulse.

Next, the output vertical synchronization pulse generating circuit 110-4 may further generate the second output Vsync pulse according to the first output Vsync pulse and a predetermined period. In the embodiments of the invention, the time difference between the first output Vsync pulse and the second output Vsync pulse may be designed according to this predetermined period. For example, the time between the first output Vsync pulse and the second output Vsync pulse may be equal to this predetermined period. The output vertical synchronization pulse generating circuit 110-4 may also generate the second output request according to the second output Vsync pulse.

In response to the second output request, the data buffer circuit 110-5 accordingly generates the second output frame according to the buffered input image data. For example, the data buffer circuit 110-5 outputs the received input frame, again, as the second output frame in response to the second output request, so that the scaler 110 may accordingly output the input frame as the second output frame via the output interface 110-2 in response to the second output Vsync pulse.

In the embodiments of the invention, for one input Vsync pulse (and one input frame), the number of output Vsync pulses (and the number of output frames) generated by the scaler 110 may be determined according to the difference or multiple relationship between the input frame rate and the frame rate supported by the display panel 120. For example, when N times of the input frame rate falls within the range of the frame rates supported by the display panel 120, the scaler 110 may generate N output Vsync pulses (and N output frames) based on one input Vsync pulse (and one input frame), so that the output frame rate corresponding to each output frame will be higher than the input frame rate, and the output frame rates of the output frames are all supported by the display panel 120.

Figure 3:
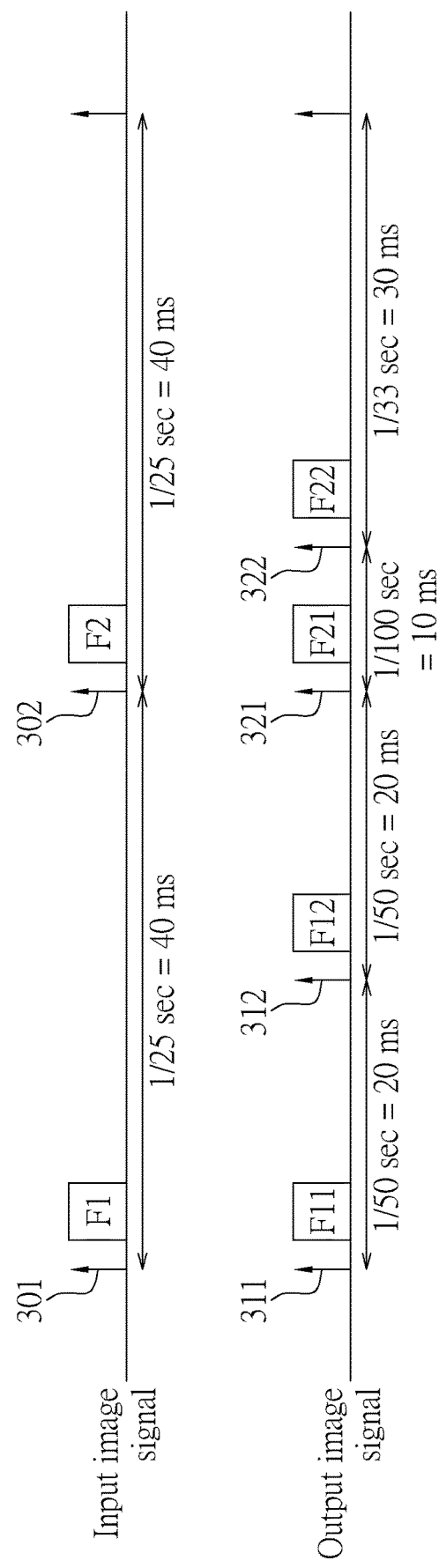
FIG. 3 is a schematic diagram showing the exemplary input image signal and the output image signal according to an embodiment of the invention.

FIG. 3 is a schematic diagram showing the exemplary input image signal and the output image signal according to an embodiment of the invention, where the X axis is the time axis and the input/output image signal comprises input/out Vsync pulses (represented by the upward arrows in FIG. 3) and the input/output image data (in FIG. 3, one square represents one frame).

In this example, N=2. That is, the display time of one input frame is equal to the display time of two output frames.

The scaler 110 is arranged to accordingly generate two output Vsync pulses 311 and 312 based on the input Vsync pulse 301, and accordingly generate two output Vsync pulses 321 and 322 based on the input Vsync pulse 302. In addition, the scaler 110 is also arranged to accordingly generate two output frames F11 and F12 based on the input frame F1 and accordingly generate two output frames F21 and F22 based on the input frame F2.

Suppose that the time difference between the input Vsync pulses 301 and 302 is 40 ms and the input frame rate corresponding to the input frame F1 is 25 Hz, which is lower than 40 Hz, the lowest frame rate supported by the display panel 120, in the embodiments of the invention, the aforementioned predetermined period may be set to 20 ms, which corresponds to the frame rate 50 Hz supported by the display panel 120. The scaler 110 (or, the output vertical synchronization pulse generating circuit 110-4) may first synchronously generate the output Vsync pulse 311 according to the input Vsync pulse 301, and the data buffer circuit 110-5 may accordingly output the buffered frame as the output frame F11. Then, the scaler 110 may generate another output Vsync pulse 312 by itself after counting 20 ms, and the data buffer circuit 110-5 may output the buffered frame, again, as the output frame F12, where the content of the input frame F1 and the content of the output frames F11 and F12 are the same. Based on these operations, the frame rate corresponding to the output frames F11 and F12 will be increased to 50 Hz, which is higher than the input frame rate 25 Hz and is supported by the display panel 120.

It should be noted that the scaler 110 is not limited to equally divide the time difference between two input Vsync pulses to increase the output frame rate. In the embodiments of the invention, the time difference between two input Vsync pulses may also be unequally divided, and the result of increasing the output frame rate can also be achieved.

Suppose that the input frame rate corresponding to the input frame F2 is 25 Hz and the lowest frame rate supported by the display panel 120 is 30 Hz, the scaler 110 (or, the output vertical synchronization pulse generating circuit 110-4) may also set the aforementioned predetermined period to 10 ms, which corresponds to the frame rate 100 Hz supported by the display panel 120. Similarly, the scaler 110 (or, the output vertical synchronization pulse generating circuit 110-4) may first synchronously generate the output Vsync pulse 321 according to the input Vsync pulse 302, and the data buffer circuit 110-5 may accordingly output the buffered frame as the output frame F21. Then, the scaler 110 may generate another output Vsync pulse 322 by itself after counting 10 ms, and the data buffer circuit 110-5 may output the buffered frame, again, as the output frame F22, where the content of the input frame F2 and the content of the output frames F21 and F22 are the same. Based on these operations, the frame rate corresponding to the output frames F21 and F22 will be respectively increased to 100 Hz and 33 Hz, which are both higher than the input frame rate 25 Hz and are both supported by the display panel 120.

In the embodiments of the invention, N may also be a positive integer greater than 2.

Figure 4:
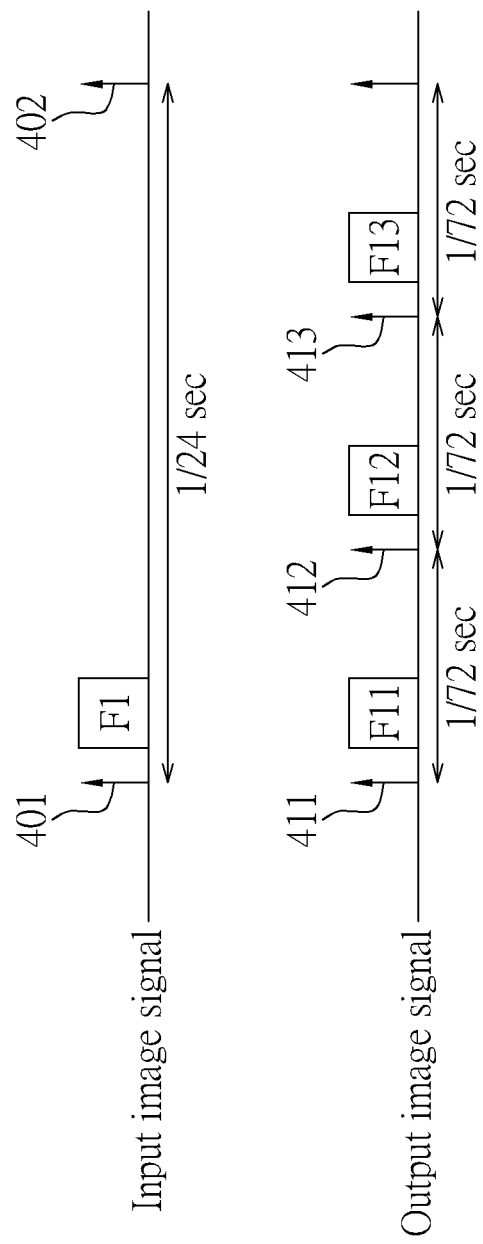
FIG. 4 is a schematic diagram showing the exemplary input image signal and the output image signal according to another embodiment of the invention.

FIG. 4 is a schematic diagram showing the exemplary input image signal and the output image signal according to another embodiment of the invention. In this example, N=3. That is, the display time of one input frame is equal to the display time of three output frames. The scaler 110 is arranged to accordingly generate three output Vsync pulses 411, 412 and 413 based on the input Vsync pulse 401, and accordingly generate three output frames F11, F12 and F13 based on the input frame F1. Suppose that the input frame rate corresponding to the input frame F1 is 24 Hz, which is lower than 40 Hz, the lowest frame rate supported by the display panel 120, the aforementioned predetermined period may be set to 1/72 seconds, which corresponds to the frame rate 72 Hz supported by the display panel 120.

The scaler 110 (or, the output vertical synchronization pulse generating circuit 110-4) may first synchronously generate the output Vsync pulse 411 according to the input Vsync pulse 401, and the data buffer circuit 110-5 may accordingly output the buffered frame as the output frame F11. Then, the scaler 110 may generate another output Vsync pulse 412 by itself after counting 1/72 seconds, and the data buffer circuit 110-5 may output the buffered frame, again, as the output frame F12. Then, the scaler 110 may generate another output Vsync pulse 413 by itself, again, after counting 1/72 seconds, and the data buffer circuit 110-5 may output the buffered frame, again, as the output frame F13, where the content of the input frame F1 and the content of the output frames F11, F12 and F13 are the same.

Based on these operations, the frame rate corresponding to the output frames F11, F12 and F13 will be increased to 72 Hz, which is higher than the input frame rate 24 Hz and is supported by the display panel 120.

It should be noted that, in the embodiments of the invention, the aforementioned predetermined period should be selected and designed according to the range of frame rates supported by the display panel 120, so that the output frame rate will be in the range of the frame rates supported by the display panel 120.

Taking N=2 as an example, suppose that the input frame rate is f1, output frame rates are fa and fb1, the predetermined period corresponding to the output frame rate fa should be designed to make the output frame rates fa and fb1 supported by the display panel and make the following equation Eq. (1) satisfied:

$$(1/f1) = (1/fa) + (1/fb1) \qquad \text{Eq. (1)}$$

In the embodiments of the invention, since the scaler 110 obtains the input frame rate corresponding to the current frame (that is, the input frame) by measuring the time difference between the adjacent two Vsync pulses of the current frame, when the possible input frame rate is known in advance, the output frame rate may be designed based on the possible input frame rate and the value N, and one or more sets of setting values may be accordingly generated. In this manner, after adopting a set of setting values, no matter what input frame rate is, the resulting output frame rates can all be increased and all be in the range of frame rates supported by the display panel 120.

Table 1 shows the output frame rates obtained based on a first set of setting values according to an embodiment of the invention.

TABLE 1 the output frame rates obtained based on the first set of setting values

|  | 24 Hz | 25 Hz | 30 Hz |
| --- | --- | --- | --- |
| First output frame rate | 48 Hz | 48 Hz | 48 Hz |
| Second output frame rate | 48 Hz | 52 Hz | 80 Hz |

In this example, N=2 and the possible input frame rates may be 24 Hz. 25 Hz and 30 Hz. In the first set of setting values, because the time difference (that is, the aforementioned predetermined period) between the time for generating the first output Vsync pulse and the second output Vsync pulse is fixed to 1/48 seconds, the first output frame rate is fixed to 48 Hz and the second frame rate will be the reciprocal of the remaining display time after subtracting the predetermined period from the display time of the input frame. For different input frame rates, that is, 24 Hz, 25 Hz and 30 Hz, as shown in Table 1, the resulting second output frame rate will be 48 Hz, 52 Hz and 80 Hz as shown in Table 1.

In other words, when the scaler 110 decides to use the first set of setting values to process the low frame image data, when detecting that the image source 200 switches the signal level of the frame rate control signal FPS_Ctrl from the first state to the second state, the scaler 110 may first synchronously generate the first output Vsync pulse according to the input Vsync pulse received subsequently, then generate the second output Vsync pulse by itself after counting 1/48 seconds. Based on these operations, the frame rate corresponding to the first output frame will be increased to 48 Hz, and depending on the input frame rate, the frame rate corresponding to the second output frame may be 48 Hz, 52 Hz or 80 Hz as shown in Table 1. On the other hand, when detecting that the image source 200 switches the signal level of the frame rate control signal FPS_Ctrl from the second state back to the first state, the scaler 110 stops the operations of frame rate conversion.

Table 2 shows the output frame rates obtained based on a second set of setting values according to another embodiment of the invention.

TABLE 2 the output frame rates obtained based on the second set of setting values

|  | 24 Hz | 25 Hz | 30 Hz |
| --- | --- | --- | --- |
| First output frame rate | 60 Hz | 60 Hz | 60 Hz |
| Second output frame rate | 40 Hz | 42 Hz | 60 Hz |

In this example, N=2 and the possible input frame rates may be 24 Hz. 25 Hz and 30 Hz. In the second set of setting values, the predetermined period is fixed to 1/60 seconds, so that the first output frame rate will be fixed to 60 Hz and the second frame rate will be 40 Hz, 42 Hz or 60 Hz as shown in Table 2, depending on the actual input frame rate.

When deciding the set of setting values to be used to process the low frame image data, when N=3, based on the similar concept, the time difference (for example, the first predetermined period) between the time for generating the first output Vsync pulse and the second output Vsync pulse may be fixed to a first value, and the time difference (for example, the second predetermined period) between the time for generating the second output Vsync pulse and the third output Vsync pulse may be fixed to a second value. By setting the first output frame rate and the second output frame rate, the third output frame rate will be formed naturally. The remaining cases for N>3 may be deduced by analogy.

In the embodiments of the invention, in a set of the setting values, the first output frame rate may be selected as the multiple of one of the possible input frame rates. In addition, when there is more than one set of setting values that can be used for processing the low frame rate image data, which set of setting values is used can be determined according to the range of the frame rates supported by the display panel 120 and the output frame rates obtained based on each set of the setting values. For example, when the output frame rates obtained based on the first set of setting values all fall in the range of the frame rates supported by the display panel 120, the first set of setting values may be selected. On the hand, when the output frame rates obtained based on the first set of setting values are not all fall in the range of the frame rates supported by the display panel 120, but the output frame rates obtained based on the second set of setting values are all fall in the range of the frame rates supported by the display panel 120, the second set of setting values may be selected.

Based on the proposed data processing method, frame rate conversion is dynamically performed according to the signal level of the frame rate control signal FPS_Ctrl and the aforementioned setting values for the low frame rate image data, so as to generate the output image data with the frame rate that can be supported by the display panel, and latency of the output image signal can also satisfy the low latency requirement as defined by the corresponding standards. In addition, not only the HDMI 2.1 Cinema VRR low frame rate image, the proposed scaler, display device and/or the data processing method can also be applied in any data processing scenarios in which frame rate conversion is required.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scaler, comprising:
   an input interface, arranged to receive an input vertical synchronization pulse and input image data;
   an output vertical synchronization pulse generating circuit, coupled to the input interface and arranged to accordingly generate a first output vertical synchronization pulse and a first output request in response to the input vertical synchronization pulse; and
   a data buffer circuit, arranged to buffer the input image data and, in response to the first output request, output a first output frame according to the input image data,
   wherein the output vertical synchronization pulse generating circuit is further arranged to generate a second output vertical synchronization pulse and a second output request according to the first output vertical synchronization pulse and a first predetermined period, and, in response to the second output request, the data buffer circuit is further arranged to output a second output frame according to the input image data.

2. The scaler of claim 1, wherein the input image data comprises an input frame, and the data buffer circuit is arranged to output the input frame as the first output frame in response to the first output request and output the input frame as the second output frame in response to the second output request.

3. The scaler of claim 2, wherein the input frame corresponds to an input frame rate, the first output frame corresponds to a first output frame rate, the second output frame corresponds to a second output frame rate, and the first output frame rate and the second output frame rate are higher than the input frame rate.

4. The scaler of claim 3, wherein the output vertical synchronization pulse generating circuit is further arranged to generate a third output vertical synchronization pulse and a third output request according to the second output vertical synchronization pulse and a second predetermined period, and, in response to the third output request, the data buffer circuit is further arranged to output the input frame as a third output frame.

5. The scaler of claim 4, wherein the third output frame corresponds to a third output frame rate and the third output frame rate is higher than the input frame rate.

6. A display device, comprising:
   a scaler, arranged to receive an input vertical synchronization pulse and input image data from an image source, generate a plurality of output vertical synchronization pulses according to the input vertical synchronization pulse and generate a plurality of output frames according to the input image data; and
   a display panel, coupled to the scaler, arranged to display the output frames according to the output vertical synchronization pulses,
   wherein the output vertical synchronization pulses comprise at least a first output vertical synchronization pulse and a second output vertical synchronization pulse, the output frames comprise at least a first output frame and a second output frame, the scaler is arranged to accordingly generate the first output vertical synchronization pulse in response to the input vertical synchronization pulse and accordingly output the first output frame in response to the first output vertical synchronization pulse, and
   the scaler is further arranged to generate the second output vertical synchronization pulse according to the first output vertical synchronization pulse and a first predetermined period, and accordingly output the second output frame in response to the second output vertical synchronization pulse.

7. The display device of claim 6, wherein the first output frame and the second output frame are the same.

8. The display device of claim 6, wherein the input image data comprises an input frame, the input frame corresponds to an input frame rate, the first output frame corresponds to a first output frame rate, the second output frame corresponds to a second output frame rate, and the first output frame rate and the second output frame rate are higher than the input frame rate.

9. The display device of claim 8, wherein the output vertical synchronization pulses further comprise a third output vertical synchronization pulse, the output frames further comprise a third output frame, the scaler is further arranged to generate the third output vertical synchronization pulse according to the second output vertical synchronization pulse and a second predetermined period, and accordingly output the third output frame in response to the third output vertical synchronization pulse.

10. The display device of claim 9, wherein the second predetermined period corresponds to a frame rate supported by the display panel.

11. The display device of claim 6, wherein the first predetermined period corresponds to a frame rate supported by the display panel.

12. A data processing method, comprising:
    receiving an input vertical synchronization pulse and input image data from an image source;
    generating a plurality of output vertical synchronization pulses according to the input vertical synchronization pulse; and
    generating a plurality of output frames according to the input image data,
    wherein the output vertical synchronization pulses comprise at least a first output vertical synchronization pulse and a second output vertical synchronization pulse, the input image data comprises an input frame, the output frames comprise at least a first output frame and a second output frame, and step of generating the output vertical synchronization pulses according to the input vertical synchronization pulse further comprises:

accordingly generating the first output vertical synchronization pulse in response to the input vertical synchronization pulse; and generating the second output vertical synchronization pulse according to the first output vertical synchronization pulse and a first predetermined period, and wherein step of generating the output frames according to the input image data further comprises:

accordingly outputting the input frame as the first output frame in response to the first output vertical synchronization pulse; and accordingly outputting the input frame as the second output frame in response to the second output vertical synchronization pulse.

13. The data processing method of claim 12, wherein the input frame corresponds to an input frame rate, the first output frame corresponds to a first output frame rate, the second output frame corresponds to a second output frame rate, and the first output frame rate and the second output frame rate are higher than the input frame rate.

14. The data processing method of claim 12, wherein the output vertical synchronization pulses further comprise a third output vertical synchronization pulse, the output frames further comprise a third output frame, and step of generating the output vertical synchronization pulses according to the input vertical synchronization pulse further comprises:

generating the third output vertical synchronization pulse according to the second output vertical synchronization pulse and a second predetermined period, and wherein step of generating the output frames according to the input image data further comprises:

outputting the input frame as the third output frame in response to the third output vertical synchronization pulse.

15. The data processing method of claim 14, wherein the input frame corresponds to an input frame rate, the first output frame corresponds to a first output frame rate, the second output frame corresponds to a second output frame rate, the third output frame corresponds to a third output frame rate, and the first output frame rate, the second output frame rate and the third output frame rate are higher than the input frame rate.

\* \* \* \* \*